(12) United States Patent
Nishiyama et al.

(10) Patent No.: US 10,641,355 B2
(45) Date of Patent: May 5, 2020

(54) TRANSMISSION BELT

(71) Applicant: MITSUBOSHI BELTING LTD., Nagata-ku, Kobe-shi, Hyogo (JP)

(72) Inventors: Takeshi Nishiyama, Hyogo (JP); Susumu Takaba, Hyogo (JP); Hisato Ishiguro, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 1011 days.

(21) Appl. No.: 14/396,788

(22) PCT Filed: Apr. 22, 2013

(86) PCT No.: PCT/JP2013/061815
§ 371 (c)(1),
(2) Date: Oct. 24, 2014

(87) PCT Pub. No.: WO2013/161777
PCT Pub. Date: Oct. 31, 2013

(65) Prior Publication Data
US 2015/0111677 A1    Apr. 23, 2015

(30) Foreign Application Priority Data

Apr. 25, 2012  (JP) .................................. 2012-100332
Oct. 19, 2012  (JP) .................................. 2012-231627

(51) Int. Cl.
*F16G 1/21* (2006.01)
*C08K 3/36* (2006.01)
(Continued)

(52) U.S. Cl.
CPC ................. *F16G 1/21* (2013.01); *C08K 3/36* (2013.01); *C08K 5/20* (2013.01); *F16G 1/10* (2013.01);
(Continued)

(58) Field of Classification Search
CPC ...... C08K 3/36; C08K 5/20; C08K 2201/006; F16G 1/10; F16G 1/12; F16G 1/21;
(Continued)

(56) References Cited

U.S. PATENT DOCUMENTS 4,500,666 A    2/1985  Wada
6,641,905 B1   11/2003 Fujimoto et al.
(Continued)

FOREIGN PATENT DOCUMENTS

CN    1641245 A    7/2005
CN    1246606 C    3/2006
(Continued)

OTHER PUBLICATIONS

Extended Search Report, dated Nov. 26, 2015, in European Patent Application No. 13 78 2485.
(Continued)

*Primary Examiner* — Camie S Thompson
(74) *Attorney, Agent, or Firm* — Wood, Phillips, Katz, Clark & Mortimer

(57) ABSTRACT

The present invention relates to a transmission belt containing a core wire extending in a lengthwise direction of the belt, an adhesive rubber layer in contact with at least a part of the core wire, a back surface rubber layer formed on one surface of the adhesive rubber layer, and an inner surface rubber layer formed on the other surface of the adhesive rubber layer and engaging or in contact with a pulley, in which the adhesive rubber layer is formed by a vulcanized rubber composition containing a rubber component, a fatty acid amide and a silica.

7 Claims, 1 Drawing Sheet

(51) Int. Cl.
*C08K 5/20* (2006.01)
*F16G 1/10* (2006.01)
*F16G 5/08* (2006.01)
*F16G 5/20* (2006.01)
*F16G 1/28* (2006.01)
*F16G 1/12* (2006.01)
*F16G 5/10* (2006.01)

(52) U.S. Cl.
CPC .............. *F16G 1/12* (2013.01); *F16G 1/28* (2013.01); *F16G 5/08* (2013.01); *F16G 5/10* (2013.01); *F16G 5/20* (2013.01); *C08K 2201/006* (2013.01)

(58) Field of Classification Search
CPC ..... F16G 1/28; F16G 5/08; F16G 5/10; F16G 5/20; F16G 5/28; C08L 11/00; C08L 23/16; C08L 3/36; B29D 29/103; B29D 29/10; B29D 29/106; D02G 3/28; D02G 3/447
USPC .............. 474/260, 264, 268, 262; 428/298.1
See application file for complete search history.

(56) References Cited

U.S. PATENT DOCUMENTS

| | | | |
|---|---|---|---|
| 7,485,060 | B2 | 2/2009 | Hineno et al. |
| 7,781,528 | B2 | 8/2010 | Takehara et al. |
| 8,329,282 | B2 | 12/2012 | Sueto et al. |
| 2008/0286529 | A1 | 11/2008 | Sueto et al. |
| 2010/0224312 | A1 | 9/2010 | Tsubaki et al. |

FOREIGN PATENT DOCUMENTS

| | | | |
|---|---|---|---|
| CN | 1277878 | C | 10/2006 |
| CN | 101413564 | A | 4/2009 |
| CN | 101838507 | A | 9/2010 |
| DE | 102008025030 | A1 | 11/2009 |
| EP | 2711587 | A1 | 3/2014 |
| JP | S61-290255 | A | 12/1986 |
| JP | 2006-124484 | A | 5/2006 |
| JP | 2008-304053 | A | 12/2008 |
| JP | 2009-236311 | A | 10/2009 |
| JP | 2012-041973 | * | 3/2012 |
| JP | 2012-041973 | A | 3/2012 |

OTHER PUBLICATIONS

Office Action dated Jun. 3, 2015, in corresponding Chinese patent application No. 201380022213.8.
"Production Process of Silicon Dioxide by Gas . . . ", China Chlor-Alkali, No. 9, Sep. 2009.
"Research Progress of Flexible Silica Aerogels", Bulletin of the Chinese Ceramic Society, vol. 29, No. 5, Oct. 2010.
Office Action in Vietnamese Patent Application No. 1-2014-03567, dated Apr. 13, 2016.
Office Action dated Mar. 21, 2018, in Indonesian Patent Application No. P00201406553.
Office Action dated Jan. 23, 2019, in Indian Patent Application No. 8940/DELNP/2014.
Notification of Reasons for Refusal, dated Oct. 28, 2014 in corresponding Japanese Appln. No. 2012-231627.
Office Action dated Nov. 19, 2019, in Brazilian Patent Application No. BR1120140267804.

* cited by examiner

TRANSMISSION BELT

TECHNICAL FILED

The present invention relates to a transmission belt such as a V-belt, a V-ribbed belt or a flat belt, and in detail, relates to a transmission belt having excellent durability performance.

BACKGROUND ART

A friction transmission belt such as a V-belt, a V-ribbed belt or a flat belt, and a synchronous power transmission belt such as a toothed belt are conventionally known as a transmission belt transmitting power. Those transmission belts have a core wire embedded in a rubber body along a lengthwise direction of the belt and this core wire plays a role of transmitting power from a drive pulley to a driven pulley. Such transmission belts are generally provided with an adhesive rubber layer in order to enhance adhesiveness between the core wire and a rubber.

Patent Document 1 discloses a rubber V-belt containing an extensible rubber layer and a compressed rubber layer each having short fibers having high elastic modulus arranged in a width direction of the belt, provided on the upper and lower sides of an adhesive rubber layer having a cord embedded therein, in which the adhesive rubber layer is constituted of a rubber composition containing 100 parts by weight of a chloroprene rubber, from 1 to 20 parts by weight of at least one metal oxide vulcanizing agent selected from zinc oxide, magnesium oxide and lead oxide, from 5 to 30 parts by weight of silica, from 15 to 50 parts by weight of a reinforcing filler, and from 2 to 10 parts by weight of bismaleimide. It is described that in this rubber V-belt, crosslinking density can be increased by compounding bismaleimide to thereby form an adhesive rubber having high elastic modulus, therefore stress concentration between the adhesive rubber and a fiber-containing rubber (a compressed rubber or an extensible rubber) is decreased, and additionally, since the adhesive rubber layer has excellent fatigue resistance, belt life can be prolonged.

However, in a layout in which a belt greatly bends and a load is high (for example, a state that a belt moves inward in a radius direction of a pulley and the belt greatly bends, like in a variable speed belt, or a state that a belt is attached by bending to a plurality of pulleys, like in a V-ribbed belt), a mere increase in elastic modulus (rubber hardness) of an adhesive rubber layer is not sufficient to prevent interfacial peeling between the adhesive rubber layer and a compressed rubber layer (or an extensible rubber layer) and peeling between a core wire and the adhesive rubber layer. Furthermore, in the case where rubber hardness of the adhesive rubber layer is excessively increased, there is a possibility that bending fatigue resistance is deteriorated.

On the other hand, in the case where rubber hardness of an adhesive rubber layer is merely decreased (for example, crosslinking density is decreased by decreasing the amount of a reinforcing filler added or using a smaller amount of a vulcanization type compounding ingredient) for the purpose of the improvement in bending fatigue resistance and adhesiveness, great difference is generated in rubber hardness between a compressed rubber layer (or an extensible rubber layer) and the adhesive rubber layer, and peeling occurs early at the interface between the adhesive rubber layer and the compressed rubber layer (or the extensible rubber layer). For this reason, it was difficult in the conventional technique to prevent interfacial peeling and improve durability without deterioration of bending fatigue resistance.

PRIOR ART DOCUMENTS

Patent Document

Patent Document 1: JP-A-61-290255

SUMMARY OF THE INVENTION

Problems that the Invention is to Solve

Accordingly, an object of the present invention is to provide a transmission belt that prevents interfacial peeling of an adhesive rubber layer from an inner surface layer and a back surface layer and has excellent durability without deteriorating bending fatigue resistance.

Means for Solving the Problems

As a result of earnest investigations to achieve the above problems, the present inventors have found that by forming an adhesive rubber layer of a transmission belt by a vulcanized rubber composition containing a rubber component, a fatty acid amide and a silica, interfacial peeling of an adhesive rubber layer from an inner surface rubber layer and a back surface rubber layer is prevented and durability can be improved without deteriorating bending fatigue resistance, and have completed the present invention.

That is, the transmission belt according to the present invention is a transmission belt containing a core wire extending in a lengthwise direction of the belt, an adhesive rubber layer (adhesive layer) in contact with at least a part of the core wire, a back surface rubber layer (back surface layer) formed on one surface of the adhesive rubber layer, and an inner surface rubber layer (inner surface layer) formed on the other surface of the adhesive rubber layer and engaging or in contact with a pulley, in which the adhesive rubber layer is formed by a vulcanized rubber composition containing a rubber component, a fatty acid amide and a silica. The proportion of the fatty acid amide may be from about 0.3 to 10 parts by mass per 100 parts by mass of the rubber component (raw material rubber). The proportion of the fatty acid amide may be from about 1 to 30 parts by mass per 100 parts by mass of the silica. The fatty acid amide may contain a fatty acid amide having a saturated or unsaturated higher fatty acid residue having from 10 to 26 carbon atoms or a higher amine residue having from 10 to 26 carbon atoms. The silica may have a nitrogen adsorption specific surface area in accordance with BET method of from about 50 to 400 $m^2/g$. The rubber component may contain chloroprene rubber. The transmission belt according to the present invention may be a friction transmission belt.

Advantageous Effects of the Invention

In the present invention, because an adhesive rubber layer of a transmission belt is formed by a vulcanized rubber composition containing a rubber component, a fatty acid amide and a silica, interfacial peeling of the adhesive rubber layer from an inner surface rubber layer and a back surface rubber layer (particularly, interfacial peeling between the adhesive rubber layer and the inner surface rubber layer) can be suppressed even though rubber hardness of the adhesive rubber layer is not increased. As a result, durability of the belt can be improved without the deterioration of bending fatigue resistance.

MODE FOR CARRYING OUT THE INVENTION

Figure 1:
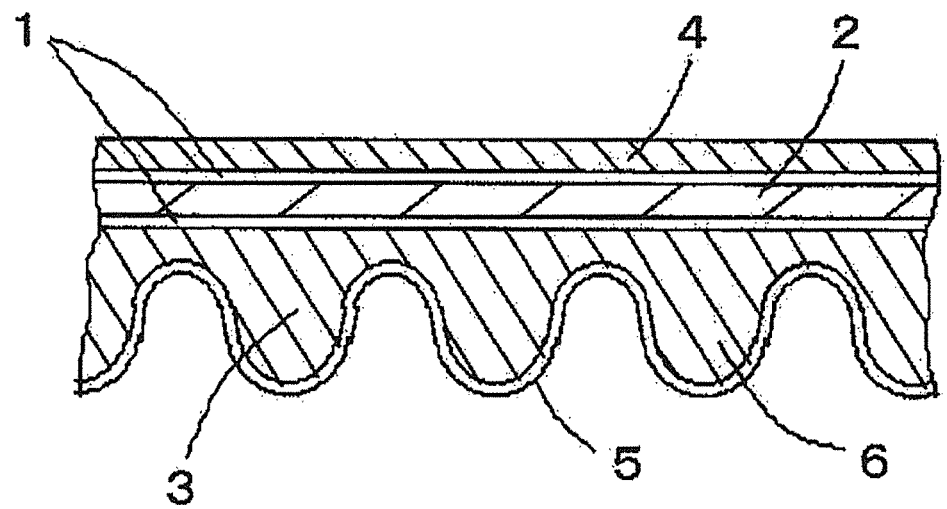
FIG. 1 is a schematic cross-sectional view illustrating one example of the transmission belt of the present invention.

[Vulcanized Rubber Composition of Adhesive Rubber Layer]

The adhesive rubber layer (an adhesive layer) is provided in contact with at least a part of a core wire for the purpose of adhering the core wire and a rubber material forming a belt. The adhesive rubber layer of the present invention is formed by a vulcanized rubber composition containing a rubber component, a fatty acid amide and a silica.

In the present invention, because the fatty acid amide acts as a dispersant, dispersibility of the silica in the vulcanized rubber composition can be improved and variation in properties of the adhesive rubber layer can be made small. Furthermore, the silica has many silanol groups (—SiOH) as reactive functional groups on the surface thereof, and can be chemically bonded to the rubber component by the silanol groups. In the present invention, by combining the silica with the fatty acid amide, the silanol groups in the silica and amide groups (—CONH— etc.) in the fatty acid amide are interacted with each other to thereby highly enhance dispersibility of the silica in the rubber composition, and additionally, adhesiveness between the silica and the rubber component can be improved. As a result, mechanical characteristics (such as tensile stress and tear force) of the adhesive rubber layer can be further improved.

(Fatty Acid Amide)

The fatty acid amide acts as a dispersant as described hereinbefore, and additionally acts as an internal lubricant in the rubber composition. When it acts as an internal lubricant, modulus of the adhesive rubber layer tends to be decreased (softened). However, the decrease in modulus can be suppressed by using silica in combination. That is, by using the fatty acid amide and the silica in combination, mechanical characteristics can be improved without excessively increasing hardness of the adhesive rubber layer. Furthermore, such combination does not require to increase rubber hardness of the adhesive rubber layer by compounding a large amount of an enhancer (reinforcing filler) such as carbon black and co-crosslinking agent such as maleimide, and can improve bending fatigue ability of a belt and fuel saving properties (particularly, fuel saving properties in the case where a belt travels with wound around small pulleys).

Furthermore, in the present invention, because the adhesive rubber layer contains the fatty acid amide, the fatty acid amide blooms (precipitates) or bleeds out on the surface (a part of friction transmission surface) of the adhesive rubber layer, and the fatty acid amide precipitated acts as an external lubricant. As a result, friction coefficient of the surface of the adhesive rubber layer can be reduced. Particularly, in a friction transmission belt such as a V-belt (a raw edge belt or a raw edge cogged V-belt), friction between the adhesive rubber layer and the pulley can be smoothed by reducing friction coefficient of the adhesive rubber layer surface in contact with the pulley, and this prevents that excessive shear force acts to a rubber layer in contact with a pulley during belt traveling, and can improve durability of the belt. That is, if friction coefficient is high, shear force received from a pulley is increased, and peeling of the adhesive rubber layer from the inner surface rubber layer and the back surface rubber layer (particularly, the inner surface rubber layer) and generation of a crack on the inner surface rubber layer surface easily occur, leading to short life of a belt; but such occurrence can be suppressed.

The fatty acid amide has a long chain fatty acid group (e.g., a fatty acid group having from about 10 to 40 carbon atoms) and an amide group in its molecule, and is a thermally and chemically stable solid surfactant. Examples of the fatty acid amide include higher fatty acid monoamides (e.g., saturated or unsaturated $C_{12-24}$ fatty acid amides or monoamides such as lauric amide, myristic amide, palmitic amide, stearic amide, hydroxystearic amide, oleic amide, ricinoleic amide, arachic amide, behenic amide, and erucamide); saturated or unsaturated higher fatty acid bisamides, for example, alkylenebis saturated or unsaturated higher fatty acid amides (e.g., $C_{1-10}$ alkylenebis saturated or unsaturated $C_{12-24}$ fatty acid amides such as methylenebis-lauric amide, methylenebis-stearic amide, methylenebis-hydroxystearic amide, methylenebis-oleic amide, ethylenebis-caprylic amide, ethylenebis-capric amide, ethylenebis-lauric amide, ethylenebis-stearic amide, ethylenebis-isostearic amide, ethylenebis-behenic amide, ethylenebis-erucamide, ethylenebis-oleic amide, tetramethylenebis-stearic amide, hexamethylenebis-stearic amide, hexamethylenebis-hydroxystearic amide, hexamethylenebis-oleic amide, and hexamethylenebis-behenic amide), and bisamides of dicarboxylic acid and higher amine (e.g., bisamides formed by a reaction of $C_{6-12}$ alkane dicarboxylic acid and higher $C_{12-24}$ amine, such as N,N'-distearyladipic amide, N,N'-distearylsebacic amide, N,N'-dioleyladipic amide, and N,N'-dioleylsebacic amide).

Examples of the fatty acid amide further include aromatic bisamides (e.g., bisamides of an aromatic diamine and a saturated or unsaturated higher fatty acid, such as xylylenebis-stearic amide, and bisamides of an aromatic dicarboxylic acid and a higher amine, such as N,N'-distearylphthalic acid amide), substituted amides (e.g., higher fatty acid amides in which a saturated or unsaturated $C_{12-24}$ fatty acid residue is amide-bonded to a nitrogen atom of an amide group, such as N-lauryl lauric amide, N-palmityl palmitic amide, N-stearyl stearic amide, N-stearyl oleic amide, N-oleyl stearic amide, N-stearyl erucamide, and N-stearylhydroxy stearic amide), ester amides (e.g., ester amides in which a hydroxyl group of alkanolamine is ester-bonded to a higher fatty acid and an amino group of the alkanolamine is amide-bonded to a $C_{12-24}$ fatty acid, such as ethanolamine dipalmitate, ethanolamine distearate, ethanolamine dibehenate, propanolamine dipalmitate, and propanolamine distearate), alkanolamides (e.g., methylolamides such as methylol $C_{12-24}$ fatty acid monoamides such as methylolstearic amide and methylolbehenic amide; and N-hydroxy $C_{2-4}$ alkyl $C_{12-24}$ fatty acid monoamide such as stearic monoethanol amide and erucic acid monoethanol amide), and substituted ureas (e.g., substituted ureas in which higher fatty acid is amide-bonded to a nitrogen atom of urea, such as N-butyl-N'-stearyl urea, N-phenyl-N'-stearyl urea, N-stearyl-N'-stearyl urea, xylylenebis-stearyl urea, toluylenebis-stearyl urea, hexamethylenebis-stearyl urea, and diphenylmethanebis-stearyl urea). In those fatty acid amides, the carbon number of higher fatty acid or higher amine (in the case of bismaleimide or the like, each higher fatty acid or each higher amine) may be from about 10 to 34 (for example, from 10 to 30, preferably from 10 to 28, more preferably from 10 to 26, and particularly preferably from 12 to 24). Those fatty acid amides can be used alone or in combination of two kinds or more thereof.

The melting point of the fatty acid amide can be selected from a range of from about 50 to 200° C., and is generally from 65 to 150° C., preferably from 75 to 130° C. (e.g., from 80 to 120° C.), and more preferably from 90 to 110° C. (e.g., from 95 to 105° C.).

In the fatty acid amides, the carbon number of a carbon chain constituting a higher fatty acid residue or a higher amine residue is preferably from, for example, about 10 to 26 (particularly, from 12 to 24). The reason for this is not clear, but it can be assumed that if a higher fatty acid residue or a higher amine residue has too long structure, that is, has a large carbon number, the density of amide groups in a molecule is relatively decreased to reduce the rate of the interaction between amide groups in the fatty acid amide and silanol groups in silica, and as a result, dispersibility of silica in a rubber composition and adhesiveness between silica and the rubber composition cannot be sufficiently enhanced.

The proportion of the fatty acid amide is, for example, from 0.3 to 10 parts by mass, preferably from 0.4 to 8 parts by mass, and more preferably from 0.5 to 6 parts by mass (particularly, from 1 to 5 parts by mass), per 100 parts by mass of the rubber component (raw material rubber). From the standpoint of excellent balance of various characteristics, it may be, for example, from about 0.7 to 7 parts by mass (particularly, from 1 to 6.5 parts by mass). The proportion of the fatty acid amide is, for example, from 1 to 35 parts by mass, preferably from 1 to 30 parts by mass, more preferably from 1.5 to 25 parts by mass, and still more preferably from 2 to 20 parts by mass (particularly, from 3 to 15 parts by mass), per 100 parts by mass of the silica. From the standpoint of excellent balance of various characteristics, it may be, for example, from about 2.5 to 30 parts by mass (particularly, from 3 to 25 parts by mass).

In the present invention, mechanical characteristics of the adhesive rubber layer can be improved by appropriately adjusting the proportion of the fatty acid amide. Further, because the friction coefficient of the surface (a part of friction transmission surface) can be appropriately reduced, interfacial peeling of the adhesive rubber layer from an inner surface rubber layer or a back surface rubber layer due to lateral pressure from a pulley during belt traveling can be prevented. Furthermore, because hardness of the adhesive rubber layer is not excessively increased, bending stress can be reduced, and bending fatigue resistance of the belt can be improved.

In the case where the proportion of the fatty acid amide is too small, interaction between the silica and the fatty acid amide is not sufficient, and there is a possibility that mechanical characteristics of the adhesive rubber layer are insufficient or blooming of the fatty acid amide on the adhesive rubber layer surface (a part of traction transmission surface) is decreased, resulting in decrease in the effect of reducing friction coefficient. Regarding the mechanical characteristics, particularly in a V-ribbed belt, if tear force of the adhesive rubber layer is low, the phenomenon that a core wire projects from an edge of a belt (an edge of the adhesive rubber layer) during belt traveling, that is, a so-called pop-out occurs, and the life of the belt becomes short.

On the other hand, in the case where the proportion of the fatty acid amide is too large, there is a possibility that excess fatty acid amide that does not interact with the silica acts as an internal lubricant and modulus of the vulcanized rubber composition forming the adhesive rubber layer is greatly decreased, or that excess fatty acid amide blooms on the surface (the surface in contact with a core wire) of the adhesive rubber layer to form a coating film and adhesive force between the adhesive rubber layer and the core wire is decreased.

(Silica)

Silica is an ultrafine and bulky white powder formed by silicic acid and/or silicate, and has a plurality of silanol groups on the surface thereof. Therefore, the silica can be chemically bonded to the rubber component.

The silica includes dry silica, wet silica and surface-treated silica. Further, the silica also can be classified into, for example, dry process white carbon, wet process white carbon, colloidal silica, and precipitated silica, depending on the classification by processes. Those silicas can be used alone or in combination of two kinds or more thereof. Of those, wet process white carbon containing hydrated silicic acid as a main component is preferred from the standpoints of many surface silanol groups and strong chemical bonding force to a rubber.

The silica has an average particle diameter of, for example, from 1 to 1,000 nm, preferably from 3 to 300 nm, and more preferably from 5 to 100 nm (for example, from 10 to 50 nm). In the case where the particle size of the silica is too large, mechanical characteristics of the adhesive rubber layer is deteriorated; whereas if it is too small, it is difficult to uniformly disperse.

The silica may be non-porous silica and may be porous silica. Nitrogen adsorption specific surface area by BET method is, for example, from 50 to 400 $m^2/g$, preferably from 70 to 350 $m^2/g$, and more preferably from 100 to 300 $m^2/g$ (particularly, from 150 to 250 $m^2/g$). In the case where the specific surface area is too large, it is difficult to uniformly disperse; whereas if the specific surface area is too small, mechanical characteristics of the adhesive rubber layer are deteriorated.

The proportion of the silica is, for example, from 1 to 100 parts by mass, preferably from 3 to 80 parts by mass, and more preferably from 5 to 40 parts by mass (for example, from 10 to 35 parts by mass), per 100 parts by mass of the rubber component (raw material rubber). In the case where the proportion of the silica is too large, elasticity and adhesive force of the adhesive rubber layer are deteriorated; whereas if it is too small, rubber hardness of the adhesive rubber layer is deteriorated and strength and tear force are also deteriorated.

(Rubber Component)

Examples of the rubber component include vulcanizable or crosslinkable rubbers, for example, diene rubbers (e.g., natural rubber, isoprene rubber, butadiene rubber, chloroprene rubber, styrene-butadiene rubber (SBR), acrylonitrile-butadiene rubber (nitrile rubber), or hydrogenated nitrile rubber), ethylene-α-olefin elastomers, chlorosulfonated polyethylene rubbers, alkylated chlorosulfonated polyethylene rubbers, epichlorohydrin rubbers, acrylic rubbers, silicone rubbers, urethane rubbers, and fluorine rubbers. Those rubber components can be used alone or in combination of two kinds or more thereof.

Of those, ethylene-α-olefin elastomers (e.g., ethylene-α-olefin rubbers such as ethylene-propylene rubber (EPR) and ethylene-propylene-diene monomer (e.g., EPDM)) and chloroprene rubbers are preferred, and chloroprene rubbers are particularly preferably contained. In the rubber component, the proportion of the chloroprene rubber may be about 50% by mass or more (particularly, from 80 to 100% by mass). The chloroprene rubber may be sulfur-modified type and may be sulfur-unmodified type. The chloroprene rubber has high adhesiveness (cohesiveness), and a rubber composition containing the chloroprene rubber as a main component generally tends to have high friction coefficient. However, in the present invention, the fatty acid amide acts as an external lubricant. Therefore, even though the chloroprene rubber is used, the increase in friction coefficient can be suppressed. That is, in the case of using the chloroprene rubber, the action of the fatty acid amide as an external lubricant is remarkably exhibited.

(Other Additives)

As necessary, the vulcanized rubber composition for forming the adhesive rubber layer may contain a vulcanizing agent or a crosslinking agent (or a crosslinking agent type), a co-crosslinking agent, a vulcanization assistant, a vulcanization accelerator, a vulcanization retarder, a metal oxide (e.g., zinc oxide, magnesium oxide, calcium oxide, barium oxide, iron oxide, copper oxide, titanium oxide, or aluminum oxide), an enhancer (e.g., carbon black), a filler (e.g., clay, calcium carbonate, talc, or mica), a softener (e.g., oils such as paraffin oil and naphthenic oil), a processing agent or a processing aid (e.g., stearic acid, stearic acid metal salt, wax or paraffin), an adhesiveness improving agent [e.g., a resorcin-formaldehyde co-condensate, an amino resin (a condensate of a nitrogen-containing cyclic compound and formaldehyde, for example, a melamine resin such as hexamethylol melamine and hexaalkoxymethyl melamine (e.g., hexamethoxymethyl melamine or hexabutoxymethyl melamine), a urea resin such as methylol urea, a benzoguanamine resin such as methylolbenzoguanamine resin, etc.), and those co-condensates (such as a resolcin-melamine-formaldehyde co-condendate), etc.], an age resister (e.g., an antioxidant, a thermal age resister, an antiflex-cracking agent, or an antiozonant), a colorant, a tackifier, a plasticizer, a coupling agent (e.g., a silane coupling agent), a stabilizer (e.g., an ultraviolet absorber or a thermal stabilizer), a flame retardant, an antistatic agent, and the like. The metal oxide may act as a crosslinking agent. Further, in the adhesiveness improving agent, the resorcin-formaldehyde co-condensate and the amino resin may be an initial condensate (a prepolymer) of a nitrogen-containing cyclic compound such as resorcin and/or melamine, and formaldehyde.

As the vulcanizing agent or crosslinking agent, conventional components can be used depending on the kind of the rubber component, and examples thereof include the above-described metal oxides (e.g., magnesium oxide or zinc oxide), organic peroxides (e.g., diacyl peroxide, peroxyester or dialkyl peroxide), and sulfur vulcanizing agents. Examples of the sulfur vulcanizing agent include powdered sulfurs, precipitated sulfurs, colloidal sulfurs, insoluble sulfurs, high-dispersible sulfurs, and sulfur chlorides (e.g., sulfur monochloride or sulfur dichloride). Those crosslinking agents or vulcanizing agents may be used alone or in combination of two kinds or more thereof. In the case where the rubber component is chloroprene rubber, the metal oxide (e.g., magnesium oxide or zinc oxide) may be used as the vulcanizing agent or the crosslinking agent. The metal oxide may be used by combining with other vulcanizing agents (e.g., sulfur vulcanizing agent), and the metal oxide and/or the sulfur vulcanizing agent may be used alone or by combining with a vulcanization accelerator.

The proportion of the vulcanizing agent can be selected from a range of from about 1 to 20 parts by mass per 100 parts by mass of the rubber component, depending on the kind of the vulcanizing agent and the rubber component. For example, the amount of the organic peroxide used as a vulcanizing agent can be selected from a range of from 1 to 8 parts by mass, preferably from 1.5 to 5 parts by mass, and more preferably from 2 to 4.5 parts by mass, per 100 parts by mass of the rubber component. The proportion of the metal oxide can be selected from a range of from 1 to 20 parts by mass, preferably from 3 to 17 parts by mass, and more preferably from 5 to 15 parts by mass (for example, from 7 to 13 parts by mass), per 100 parts by mass of the rubber component.

Examples of the co-crosslinking agent (a crosslinking aid or a co-agent) include conventional crosslinking aids, for example, polyfunctional (iso)cyanurates [e.g., triallyl isocyanurate (TRIC) or triallyl cyanurate (TAC)], polydiene (e.g., 1,2-polybutadiene), metal salts of unsaturated carboxylic acid [e.g., zinc(meth)acrylate or magnesium(meth)acrylate], oximes (e.g., quinone dioxime), guanidines (e.g., diphenyl guanidine), polyfunctional(meth)acrylates [e.g., ethylene glycol di(meth)acrylate, butanediol di(meth)acrylate or trimethylolpropane tri(meth)acrylate], bismaleimides (e.g., aliphatic bismaleimides such as N,N'-1,2-ethylene bismaleimide and 1,6'-bismaleimide-(2,2,4-trimethyl)-cyclohexane; and arene bismaleimides or aromatic bismaleimides, such as N,N'-m-phenylene bismaleimide, 4-methyl-1,3-phenylene bismaleimide, 4,4'-diphenylmethane bismaleimide, 2,2-bis[4-(4-maleimide phenoxy)phenyl]propane, 4,4'-diphenylether bismaleimide, 4,4'-diphenylsulfone bismaleimide, and 1,3-bis(3-maleimide phenoxy)-benzene. Those crosslinking aids can be used alone or in combination of two kinds or more thereof. Of those crosslinking aids, bismaleimides (arene bismaleimides or aromatic bismaleimides, such as N,N'-m-phenylene dimaleimide) are preferred. The addition of bismaleimides can increase the degree of crosslinking to prevent adhesive wear.

The proportion of the co-crosslinking agent (crosslinking aid) can be selected from, for example, a range of from about 0.01 to 10 parts by mass per 100 parts by mass of the rubber component, in terms of the solid content. However, since rubber hardness of the adhesive rubber layer is not required to be excessively increased by virtue of the combination of the fatty acid amide and the silica, the proportion of the co-crosslinking agent (particularly, bismaleimides) may be comparatively a small amount, and may be, for example, from 0.1 to 5 parts by mass, preferably from 0.3 to 4.8 parts by mass, and more preferably from 0.5 to 4.5 parts by mass (particularly, from 1 to 4 parts by mass).

Examples of the vulcanization accelerator include thiuram accelerators [e.g., tetramethyl thiuram monosulfide (TMTM), tetramethyl thiuram disulfide (TMTD), tetraethyl thiuram disulfide (TETD), tetrabutyl thiuram disulfide (TBTD), dipentamethylene thiuram tetrasulfide (DPTT), or N,N'-dimethyl-N,N'-diphenyl thiuram disulfide], thiazole accelerators [e.g., 2-mercaptobenzothiazole, a zinc salt of 2-mercaptobenzothiazole, 2-mercaptothiazoline, dibenzothiazyl disulfide, or 244% morpholinodithio)benzothiazole], sulfenamide accelerators [e.g., N-cyclohexyl-2-benzothiazyl sulfenamide (CBS) or N,N'-dicyclohexyl-2-benzothiazyl sulfenamide], bismaleimide accelerators (e.g., N,N'-m-phenylene bismaleimide or N,N'-1,2-ethylene bismaleimide), guanidines (e.g., diphenyl guanidine or di-o-tolyl guanidine), urea or thiourea accelerators (e.g., ethylene thiourea), dithiocarbamates, and xanthates. Those vulcanization accelerators can be used alone or in combination of two kinds or more thereof. Of those vulcanization accelerators, TMTD, DPTT, CBS and the like are widely used.

The proportion of the vulcanization accelerator may be, for example, from 0.1 to 15 parts by mass, preferably from 0.3 to 10 parts by mass, and more preferably from 0.5 to 5 parts by mass per 100 parts by mass of the rubber component, in terms of a solid content.

The proportion of the enhancer and the filler can be selected from a range of from about 1 to 100 parts by mass per 100 parts by mass of the rubber component. However, in the present invention, since rubber hardness of the adhesive rubber layer is not required to be excessively increased by virtue of the combination of the fatty acid amide and the silica, the proportion of the enhancer and the filler (particularly, the enhancer such as carbon black) may be comparatively a small amount, and may be, for example, from 1 to 50 parts by mass, preferably from 3 to 30 parts by mass, and more preferably from 5 to 25 parts by mass (particularly, from 10 to 20 parts by mass).

The proportion of the softener (oils such as naphthenic oil) may be, for example, from 1 to 30 parts by mass, and preferably from 3 to 20 parts by mass (for example, from 5 to 10 parts by mass), per 100 parts by mass of the rubber component. Furthermore, the proportion of the processing agent or the processing aid (e.g., stearic acid) may be, for example, 10 parts by mass or less (for example, from 0 to 10 parts by mass), preferably from 0.1 to 5 parts by mass, and more preferably from 0.3 to 3 parts by mass (particularly, from 0.5 to 2 parts by mass), per 100 parts by mass of the rubber component.

The proportion of the adhesiveness improving agent (e.g., resorcin-formaldehyde co-condensate or hexamethoxymethyl melamine) may be from 0.1 to 20 parts by mass, preferably from 0.3 to 10 parts by mass, and more preferably from 0.5 to 5 parts by mass (from 1 to 3 parts by mass), per 100 parts by mass of the rubber component.

The proportion of the age resister may be, for example, from 0.5 to 15 parts by mass, preferably from 1 to 10 parts by mass, and more preferably from 2.5 to 7.5 parts by mass (for example, from 3 to 7 parts by mass), per 100 parts by mass of the rubber component.

(Characteristics of Adhesive Rubber Layer)

The mechanical characteristics of the adhesive rubber layer can be appropriately selected depending on required performance and rubber hardness can be, for example, in a range of from 80 to 90° in the method in accordance with JIS K6253 (2012). Since mechanical characteristics are improved by the combination of the fatty acid amide and the silica, hardness of the adhesive rubber layer is not required to be excessively increased, and the rubber hardness may be from about 80 to 83° (particularly, from 80 to 82°). An adhesive rubber layer having relatively high rubber hardness may be formed and the rubber hardness may be adjusted to, for example, from about 84 to 90° by compounding large amounts of a reinforcing filler or a vulcanization compounding ingredient.

The thickness of the adhesive rubber layer can be appropriately selected depending on the kind of a belt, and may be, for example, from 0.4 to 3.0 mm, preferably from 0.6 to 2.2 mm, and more preferably from 0.8 to 1.4 mm.

[Transmission Belt]

The transmission belt of the present invention contains the adhesive rubber layer. In detail, the transmission belt contains a core wire extending in a lengthwise direction of the belt, an adhesive rubber layer in contact with at least a part of the core wire, a back surface rubber layer formed on one surface of the adhesive rubber layer, and an inner surface rubber layer formed on the other surface of the adhesive layer and at a side (inner side) engaging or being in contact with a pulley. Examples of the transmission belt include friction transmission belts such as a V-belt, a V-ribbed belt and a flat belt, and synchronous power transmission belts such as a toothed belt. Of those, the friction transmission belt such as a V-belt or a V-ribbed belt is preferred, and a V-belt in which the surface (a part of friction transmission surface) of the adhesive rubber layer is in contact with a pulley (particularly, a variable speed belt used in a transmission in which transmission gear ratio is continuously variable during belt traveling) is particularly preferred. Examples of the V-belt include a raw edge belt and a raw edge cogged V-belt which has cogs provided on the inner surface rubber layer side or both the inner surface rubber layer side and the back surface rubber layer side of the raw edge belt.

FIG. 1 is a schematically cross-sectional view illustrating one example of the transmission belt (raw edge cogged V-belt) of the present invention. In this example, a core wire 2 is embedded in an adhesive rubber layer 1, an inner surface rubber layer 3 is laminated on one surface of the adhesive rubber layer 1, and a back surface rubber layer 4 is laminated on the other surface of the adhesive rubber layer 1. The core wire 2 is integrally embedded with being sandwiched between a pair of adhesive rubber sheets. A reinforcing cloth 5 is laminated on the inner surface rubber layer 3, and a cog part 6 is formed by a cogged forming die. The laminate of the inner surface rubber layer 3 and the reinforcing cloth 5 is integrally formed by vulcanizing the laminate of the reinforcing cloth and an inner surface rubber layer sheet (unvulcanized rubber sheet).

(Core Wire)

The adhesive rubber layer is required to be in contact with at least a part of the core wire, is not limited to the embodiment that the core wire is buried in the adhesive rubber layer, may be the embodiment in which the core wire is embedded between the adhesive rubber layer and the back surface rubber layer or between the adhesive rubber layer and the inner surface rubber layer, and may be the embodiment in which a part of an adhesive rubber layer at which the adhesive rubber layer is in contact with a tooth part is formed so as to expand toward a back side (back surface layer side) or a tooth part side (inner surface rubber layer side) relative to the core wire, like the toothed belt disclosed in JP-A-2009-41768.

Examples of the fiber constituting the core wire include synthetic fibers, for example, polyolefin fibers (e.g., polyethylene fiber or polypropylene fiber), polyamide fibers (e.g., polyamide 6 fiber, polyamide 66 fiber, polyamide 46 fiber or aramid fiber), polyalkylene arylate fibers [e.g., poly $C_{2-4}$ alkylene $C_{6-14}$ arylate fibers such as polyethylene terephthalate (PET) fiber and polyethylene naphthalate (PEN) fiber], vinylon fibers, polyvinyl alcohol fibers, and polyparaphenylene benzobisoxasol (PBO) fiber; natural fibers such as cotton, hemp and wool; and inorganic fibers such as carbon fiber. Of those, synthetic fibers such as polyester fiber or aramid fiber, and inorganic fibers such as glass fiber or carbon fiber are widely used from the standpoint of high modulus, and polyester fibers such as polyethylene terephthalate fiber or polyethylene naphthalate fiber, and aramid fibers are particularly preferred from the standpoint that a belt slip ratio can be decreased. The polyester fibers may be a multifilament yarn. Denier value of the core wire constituted of the multifilament yarn may be, for example, from about 2,000 to 10,000 deniers (particularly, from 4,000 to 8,000 deniers). The core wire may be subjected to a conventional adhesive treatment such as an adhesive treatment by a resorcin-formalin-latex liquid (RFL liquid) for the purpose of improving adhesiveness to the rubber component.

Twisted cord using a multifilament yarn (e.g., organzine, single twist or Lang lay) can be generally used as the core wire. The average wire diameter of the core wire (fiber diameter of twisted cord) may be, for example, from 0.5 to 3 mm, preferably from 0.6 to 2 mm, and more preferably from 0.7 to 1.5 mm. The core wires may be embedded in the lengthwise direction of the belt with being arranged in parallel with each other to the lengthwise direction of the belt at predetermined pitches.

(Inner Surface Rubber Layer and Back Surface Rubber Layer)

The vulcanized rubber composition for forming the inner surface rubber layer (inner surface layer or internal layer) and the back surface rubber layer (back surface layer) may contain a rubber component e.g., chloroprene rubber), a vulcanizing agent or a crosslinking agent (e.g., a metal oxide such as magnesium oxide and zinc oxide, or a sulfur vulcanizing agent such as sulfur), a co-crosslinking agent or a crosslinking aid (e.g., a maleimide crosslinking agent such as N,N'-m-phenylene dimaleimide), a vulcanization accelerator (e.g., TMTD, DPTT or CBS), an enhancer (e.g., carbon black or silica), a softener (e.g., oils such as naphthenic oil), a processing agent or a processing aid (e.g., stearic acid, a stearic acid metal salt, a wax, or a paraffin), an age resister, an adhesiveness improving agent, a filler (e.g., clay, calcium carbonate, talc or mica), a colorant, a tackifier, a plasticizer, a coupling agent (e.g., a silane coupling agent), a stabilizer (e.g., an ultraviolet absorber or a thermal stabilizer), a flame retardant, an antistatic agent, and the like, similar to the vulcanized rubber composition of the adhesive rubber layer. As necessary, the inner surface rubber layer and the back surface rubber layer may contain fatty acid amide and/or silica in order to improve durability of a belt, similar to the adhesive rubber layer.

The vulcanized rubber composition for forming the inner surface rubber layer and the back surface rubber layer may further contain short fibers. Examples of the short fiber include the same fibers as in the core wire. Preferred is a short fiber containing the synthetic fiber or the natural fiber among the above-described fibers, particularly, the synthetic fiber (e.g., polyamide fiber or polyalkylene arylate fiber), above all, at least aramide fiber from the view point of having rigidity, high strength and modulus. The average length of the short fiber is, for example, from 1 to 20 mm, preferably from 2 to 15 mm, and more preferably from 3 to 10 mm, and the average fiber diameter thereof is, for example, from 5 to 50 µm, preferably from 7 to 40 µm, and more preferably from 10 to 35 µm. The short fiber may be subjected to an adhesive treatment (or a surface treatment), similar to the core wire.

In the rubber composition, rubbers of the same series (e.g., diene rubber) or the same kind (e.g., chloroprene rubber) as the rubber component in the rubber composition of the adhesive rubber layer are often used as the rubber component.

The proportions of the vulcanizing agent or crosslinking agent, the co-crosslinking agent or crosslinking aid, the vulcanization accelerator, the enhancer, the softener, the processing agent or processing aid, the age resister, the fatty acid amide, and the silica can be selected from the same range as in the rubber composition of the adhesive rubber layer, respectively. The proportion of the short fiber can be selected from a range of from about 5 to 50 parts by mass per 100 parts by mass of the rubber component, and may be generally from about 10 to 40 parts by mass, preferably from 15 to 35 parts by mass, and more preferably from 20 to 30 parts by mass.

The thickness of the inner surface rubber layer can be appropriately selected depending on the kind of the belt, and is, for example, from about 2 to 25 mm, preferably from 3 to 16 mm, and more preferably from 4 to 12 mm. The thickness of the back surface rubber layer can be also appropriately selected depending on the kind of the belt, and is from about 0.8 to 10.0 mm, preferably from 1.2 to 6.5 mm, and more preferably from 1.6 to 5.2 mm.

(Reinforcing Cloth)

The case of using a reinforcing cloth in the transmission belt is not limited to the embodiment in which the reinforcing cloth is laminated on the surface of the inner surface rubber layer, and may be, for example, the embodiment in which the reinforcing cloth may be laminated on the surface of the back surface rubber layer (the surface opposite the adhesive rubber layer), or the embodiment in which the reinforcing layer is embedded in the inner surface rubber layer and/or the back surface rubber layer (e.g., the embodiment described in JP-A-2010-230146). The reinforcing cloth can be formed by, for example, a cloth material such as a woven fabric, a wide-angle canvas, a knitted fabric, or a non-woven fabric (preferably a woven fabric), and as necessary, it may be laminated on the surface of the inner surface rubber layer and/or the back surface rubber layer after being subjected to the adhesive treatment described above such as a treatment with RFL liquid (e.g., dipping treatment), friction in which the adhesive rubber layer is rubbed in the cloth material, or lamination (coating) of the adhesive rubber and the cloth material.

In the description, in the case where the reinforcing cloth is laminated on the surface of the inner surface rubber layer or the back surface rubber layer, the inner surface rubber layer or the back surface rubber layer is defined as the state including the reinforcing cloth (i.e., the laminate of the inner surface rubber layer or the back surface rubber layer and the reinforcing cloth).

[Production Method of Transmission Belt]

The production method of the transmission belt of the present invention is not particularly limited, and the conventional method can be utilized for a lamination step of each layer (production method of a belt sleeve).

For example, in the case of a cogged V-belt, a laminate of the reinforcing cloth (lower cloth) and the inner surface rubber layer sheet (unvulcanized rubber) is arranged in a flat mold with cogs in which tooth portions and groove portions are alternatively provided, in the state of the reinforcing cloth down, and press-pressurized at a temperature of from about 60 to 100° C. (particularly, from 70 to 80° C.) to prepare a cogged pad having cog portions embossed (a pad which is not completely vulcanized and in a semi-vulcanized state), and thereafter both ends of the cogged pad may be vertically cut from the top of a mountain portion of the cog. A molded article may be prepared by covering a cylindrical mold with an inner matrix having tooth portions and groove portions alternately provided, and then, winding the cogged pad so as to engage with the tooth portions and groove portions of the inner matrix and jointing itself at the top of the cog mountain portion, laminating a first adhesive rubber layer sheet (a lower adhesive rubber: unvulcanized rubber) on the cogged pad wound, spinning the core wire spirally thereon, and sequentially winding a second adhesive rubber layer sheet (an upper adhesive rubber: the same as the above adhesive rubber layer sheet), a back surface rubber layer sheet (unvulcanized rubber) and, a reinforcing cloth (an upper cloth) further thereon. The mold is thereafter covered with a jacket and arranged in a vulcanization can, and vulcanization is conducted at a temperature of from about 120 to 200° C. (particularly, from 150 to 180° C.) to prepare a belt sleeve. The belt sleeve may be then cut into a V-shape by using a cutter or the like.

EXAMPLES

The present invention is described below in more detail based on examples, but it should be understood that the invention is not limited by those examples. In the following examples, measurement method and evaluation method in each property, and raw materials used in the examples are described below. Unless otherwise indicated, all parts and % are mass basis.

[Properties of Vulcanized Rubber Composition]

(1) Hardness, Tensile Test and Tear Test

Unvulcanized adhesive rubber layer sheets and inner surface rubber layer sheets (back surface rubber layer sheets) shown in Tables 1 and 2 were press-vulcanized (pressure: 2.0 MPa) at a temperature of 160° C. for a period of 20 minutes to prepare vulcanized rubber sheets (length: 100 mm, width: 100 mm, thickness: 2 mm).

(Hardness)

In accordance with JIS K6253 (2012), a laminate obtained by stacking three vulcanized rubber sheets was used as a sample, and its hardness was measured by using a durometer A type hardness tester.

(Tensile Test)

The tensile test was conducted in accordance with JIS K6251 (2010). The vulcanized rubber sheet was punched into a dumbbell shape as a sample. The sample was pulled with a tensile tester, and stress (stress at 100% elongation) at the time when the sample was stretched 100%, and strength (strength at break) and elongation (elongation at break) at the time of broken were measured. Regarding the adhesive rubber layer sheet, a tensile test was conducted such that a tensile direction is a rolling direction of the rubber sheet, and stress at 100% elongation, strength at break and elongation at break were measured. Regarding the inner surface rubber layer sheet (back surface rubber layer sheet), a tensile test was conducted by using a sample in which short fibers are oriented in parallel to a tensile direction and a sample in which short fibers are oriented vertical. Regarding the parallel direction, strength at break was measured, and regarding the vertical direction, stress at 100% elongation, strength at break and elongation at break were measured.

(Tear Test)

The tear test was conducted in accordance with JIS K6252 (2007). The vulcanized rubber sheet was punched into an angle shape, the angle shape was pulled with a tensile tester, and tear force was measured. Regarding the adhesive rubber layer sheet, a tear direction was a direction parallel to a rolling direction of the rubber sheet. Regarding the inner surface rubber layer sheet (back surface rubber layer sheet), orientation of the short fibers was a direction vertical to the tensile direction, that is, a direction parallel to the tear direction.

(2) Peel Force

A plurality of core wires were arranged in parallel on one surface of the unvulcanized adhesive rubber layer sheets (four kinds of Example 3, Example 5, Comparative Example 1 and Comparative Example 2) having a thickness of 4 mm as shown in Table 1 such that a width is 25 mm, and a canvas was laminated on the other surface. The resulting laminate (core wire, adhesive rubber layer sheet and canvas) was press-vulcanized (temperature: 160° C., time: 20 minutes and pressure: 2.0 MPa) to prepare a strip sample for a peel test (width: 25 mm, length: 150 mm; and thickness: 4 mm). In accordance with JIS K6256 (2006), a peel test was conducted in a tensile rate of 50 mm/min, and peel force (vulcanization adhesive force) between the core wire and the adhesive rubber layer sheet was measured in a room temperature atmosphere.

[Properties of Belt]

Figure 2:
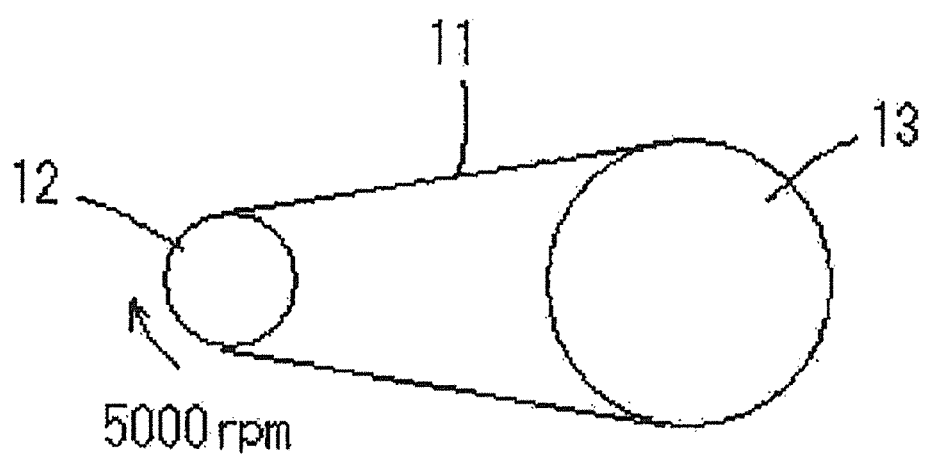
FIG. 2 is a schematic view for describing a durability traveling test in the Examples.

As shown in FIG. 2, durability traveling test was conducted by using a two-axial traveling testing machine consisting of a drive (Dr.) pulley 12 having a diameter of 50 mm and a driven (Dn.) pulley 13 having a diameter of 125 mm. Next, a raw edge cogged V-belt 11 was hung on each of the pulleys 12 and 13, a load of 10 N·m (durability traveling test 1: intermediate load durability) or 15 N·m (durability traveling test 2: high load durability) was applied to the driven pulley 13 in which the number of revolution of the drive pulley 12 is 5,000 rpm, and the belt was traveled for at most 60 hours at an atmosphere temperature of 80° C. When the belt 11 could be traveled for 60 hours, it was judged that there is no problem in durability. Regarding the belt that was not traveled for 60 hours and generated peeling (separation) at the interface between the adhesive rubber layer and the inner surface rubber layer, the time when peeling (peeling in a depth of about 1 mm from the belt edge) occurred was confirmed.

[Raw Materials]

Fatty acid amide: Stearic acid amide (structural formula: $C_{18}H_{37}NO$), "AMIDE AP-1" manufactured by Nippon Kasei Chemical Co., Ltd., melting point: 101° C.

Fatty acid bisamide: Ethylenebisoleic acid amide (structural formula: $C_{38}H_{72}N_2O_2$), "SLIPACKS O" manufactured by Nippon Kasei Chemical Co., Ltd.

Fatty acid ester amide: Ethanolamine distearate, "SLIAID S" manufactured by Nippon Kasei Chemical Co., Ltd.

Naphthenic oild: "RS700" manufactured by DIC Corporation

Silica A: "ULTRASIL VN-3" manufactured by Evonik Degussa Japan, specific surface area: 155 to 195 $m^2/g$ Silica B: "NIPSIL ER" manufactured by Tosoh Silica Corporation, specific surface area: 70 to 120 $m^2/g$ Silica C: "NIPSIL KQ" manufactured by Tosoh Silica Corporation, specific surface area: 215 to 265 $m^2/g$ Carbon black: "SEAST 3" manufactured by Tokai Carbon Co., Ltd.

Resorcin.formalin copolymer (resorcinol resin): Resorcin.formalin copolymer having less than 20% of resorcinol and less than 0.1% of formalin Age resister: "NONFLEX OD3" manufactured by Seiko Chemical Co., Ltd.

Vulcanization accelerator TMTM: Tetramethylthiuram. monosulfide

Aramide short fiber: "CORNEX Short Fiber" manufactured by Teijin Techno Products Limited, short fibers having an average fiber length of 3 mm and an average fiber diameter of 14 μm, having been subjected to an adhesive treatment with an RFL liquid (resorcin: 2.6 parts, 37% formalin: 1.4 parts, vinylpyridine-styrene-butadiene copolymer latex (manufactured by Zeon Corporation): 17.2 parts, water 78.8 parts), and having an adhesion ratio of solid contents of 6% by mass Core wire: Fiber obtained by subjecting a plied cord having total denier of 6,000 obtained by twisting PET fibers of 1,000 deniers in twisting structure of 2×3 with a second twist coefficient of 3.0 and a first twist coefficient of 3.0, to an adhesive treatment Examples 1 to 5 and Comparative Examples 1 and 2

(Formation of Rubber Layer)

Rubber compositions shown in Tables 1 and 2 (adhesive rubber layer) and Table 3 (inner surface rubber layer and back surface rubber layer) were kneaded by using a conventional method such as Banbury mixer, respectively, and the kneaded rubbers were passed through calendar rolls to prepare rolled rubber sheets (adhesive rubber layer sheet, inner surface rubber layer sheet, and back surface rubber layer sheet).

In Table 3, the inner surface rubber layer material and the back surface rubber layer material have the same rubber composition, Rubber 1 is for the use in intermediate load, and Rubber 2 is for the use in high load. Regarding the compounding, Rubber 2 has the formulation that amounts of aramide short fiber, carbon black and N,N'-m-phenylene dimaleimide added are make large as compared with Rubber 1, thereby making the rubber composition hard to increase modulus (lateral pressure resistance).

In Table 1, Examples 4 to 8 have the formulation that the amount of the fatty acid amide was changed (2, 4, 6, 8 and 10 parts), and have the same composition except for the fatty acid amide. Example 1 is the same as Example 4, except that fatty added amide and stearic acid are added in an amount of 0.3 parts and 1 part, respectively. Examples 2 and 3 are the same as Example 1, except that fatty acid amide is added in an amount of 0.5 parts or 1 part. Comparative Example 1 has the same composition as Example 4, except that stearic acid is added in an amount of 2 parts in place of fatty acid amide. Comparative Example 2 has the same composition as Comparative Example 1, except that N,N'-m-phenylene dimaleimide is added in an amount of 8 parts. Comparative Examples 1 and 2 are materials corresponding to adhesive rubber layers used in the rubber V-belt disclosed in Patent Document 1 (JP-A-61-290255), as shown in Table 1 below.

In Table 2, Examples 9 and 10 have the same composition as Example 3, except that silica having different specific surface area is added. Comparative Examples 3 and 4 have the same composition as Comparative Example 1, except that silica having different specific surface area is added.

Evaluation results of properties of the vulcanized rubber composition obtained in the examples and the comparative examples are also shown in Tables 1 to 3.

TABLE 1

| | Example | | | | | | | | Comparative Example | |
|---|---|---|---|---|---|---|---|---|---|---|
| Material (parts) | 1 | 2 | 3 | 4 | 5 | 6 | 7 | 8 | 1 | 2 |
| Chloroprene rubber | 100 | 100 | 100 | 100 | 100 | 100 | 100 | 100 | 100 | 100 |
| Fatty acid amide | 0.3 | 0.5 | 1 | 2 | 4 | 6 | 8 | 10 | 0 | 0 |
| Stearic acid | 1 | 1 | 1 | 0 | 0 | 0 | 0 | 0 | 2 | 2 |
| N,N'-m-phenylene dimaleimide | 4 | 4 | 4 | 4 | 4 | 4 | 4 | 4 | 4 | 8 |
| Naphthenic oil | 5 | 5 | 5 | 5 | 5 | 5 | 5 | 5 | 5 | 5 |
| Magnesium oxide | 4 | 4 | 4 | 4 | 4 | 4 | 4 | 4 | 4 | 4 |
| Silica A | 30 | 30 | 30 | 30 | 30 | 30 | 30 | 30 | 30 | 30 |
| Carbon black | 20 | 20 | 20 | 20 | 20 | 20 | 20 | 20 | 20 | 20 |
| Resorcin•formalin copolymer | 2 | 2 | 2 | 2 | 2 | 2 | 2 | 2 | 2 | 2 |
| Age resister | 4 | 4 | 4 | 4 | 4 | 4 | 4 | 4 | 4 | 4 |
| Zinc oxide | 5 | 5 | 5 | 5 | 5 | 5 | 5 | 5 | 5 | 5 |
| Vulcanization accelerator TMTD | 1 | 1 | 1 | 1 | 1 | 1 | 1 | 1 | 1 | 1 |
| Hexamethoxymethylol melamine | 2 | 2 | 2 | 2 | 2 | 2 | 2 | 2 | 2 | 2 |
| Hardness (°) | 80 | 80 | 81 | 81 | 81 | 81 | 80 | 79 | 80 | 86 |
| stress at 100% elongation (MPa) | 4.2 | 4.2 | 4.7 | 5.0 | 5.2 | 5.4 | 5.1 | 4.7 | 4.0 | 5.6 |
| Strength at break (MPa) | 18.9 | 19.4 | 19.6 | 18.8 | 19.4 | 19.6 | 19.1 | 18.4 | 19.2 | 17.8 |
| Elongation at break (%) | 406 | 430 | 430 | 400 | 420 | 425 | 489 | 529 | 450 | 395 |
| Tear force (N/mm) | 60 | 60 | 62 | 65 | 66 | 65 | 62 | 60 | 58 | 48 |
| Peel force (N/25 mm) | 395 | 411 | 420 | 420 | 437 | 445 | 429 | 430 | 360 | 352 |

TABLE 2

| | Example | | | Comparative Example | | |
|---|---|---|---|---|---|---|
| Material (parts) | 3 | 9 | 10 | 1 | 3 | 4 |
| Chloroprene rubber | 100 | 100 | 100 | 100 | 100 | 100 |
| Fatty acid amide | 1 | 1 | 1 | 0 | 0 | 0 |
| Stearic acid | 1 | 1 | 1 | 2 | 2 | 2 |
| N,N'-m-phenylene dimaleimide | 4 | 4 | 4 | 4 | 4 | 4 |
| Naphenic oil | 5 | 5 | 5 | 5 | 5 | 5 |
| Magnesium oxide | 4 | 4 | 4 | 4 | 4 | 4 |
| Silica A | 30 | 0 | 0 | 30 | 0 | 0 |
| Silica B | 0 | 30 | 0 | 0 | 30 | 0 |
| Silica C | 0 | 0 | 30 | 0 | 0 | 30 |
| Carbon black | 20 | 20 | 20 | 20 | 20 | 20 |
| Resorcin•formalin copolymer | 2 | 2 | 2 | 2 | 2 | 2 |
| Age resister | 4 | 4 | 4 | 4 | 4 | 4 |
| Zinc oxide | 5 | 5 | 5 | 5 | 5 | 5 |
| Vulcanization accelerator TMTD | 1 | 1 | 1 | 1 | 1 | 1 |
| Hexamethoxymethylol melamine | 2 | 2 | 2 | 2 | 2 | 2 |
| Hardness (°) | 81 | 80 | 82 | 80 | 78 | 81 |
| stress at 100% elongation (MPa) | 4.7 | 4.4 | 5.1 | 4.0 | 3.6 | 4.5 |
| Strength at break (MPa) | 19.6 | 18.0 | 19.9 | 19.2 | 17.5 | 19.3 |
| Elongation at break (%) | 430 | 440 | 396 | 450 | 465 | 391 |
| Tear force (N/mm) | 62 | 56 | 71 | 58 | 52 | 65 |
| Peel force (N/25 mm) | 420 | 421 | 402 | 360 | 353 | 339 |

TABLE 3

| Material (parts) | Rubber 1 | Rubber 2 |
|---|---|---|
| Chloroprene rubber | 100 | 100 |
| Aramide short fiber | 20 | 30 |
| Naphthenic oil | 5 | 5 |
| Magnesium oxide | 4 | 4 |
| Carbon black | 30 | 40 |
| Age resister | 4 | 4 |
| Zinc oxide | 5 | 5 |
| N,N'-m-phenylene dimaleimide | 4 | 4 |
| Stearic acid | 2 | 2 |
| Vulcanization accelerator TMTD | 1 | 1 |
| Sulfur | 0.5 | 0.5 |
| Hardness (°) | 88 | 94 |
| stress at 100% elongation (vertical) (MPa) | 9 | — |
| Strength at break (parallel) (MPa) | 24 | 45 |
| Strength at break (vertical) (MPa) | 11.2 | 11.8 |
| Elongation at break (vertical) (%) | 236 | 75 |
| Tear force (parallel) (N/mm) | 70 | 85 |

As is apparent from the results of Table 1, in Examples 4 to 6 in which the proportion of the fatty acid amide was changed, difference in hardness is not appeared, but stress at 100% elongation, strength at break and elongation at break were increased with increasing the amount of the fatty acid amide. This tendency was confirmed in Examples 1 to 3 in which stearic acid was added. On the other hand, in Examples 7 and 8 in which the proportion of the fatty acid amide is 8 parts or more, elongation at break is improved, but stress at 100% elongation, strength at break, tear force and peel force were slightly decreased. This tendency can be assumed to be that excess fatty acid amide that does not interact with silica is increased and this fatty acid acts as an internal lubricant (softener). Even though the proportion of the fatty acid amide is 0.3 parts, Example 1 showed high peel force as compared with Comparative Example 1 in which fatty acid amide is not added. Even though the proportion of the fatty acid amide is small, adhesiveness was improved.

In the comparison between Example 4 and Comparative Example 1, Example 4 in which the fatty acid amide was added showed high stress at 100% elongation, but low strength at break and lower elongation at break. The reason for this is considered that the fatty acid amide interacts with silica to improve dispersibility of silica and adhesiveness between the silica and the rubber component, and to enhance modulus (stress at 100% elongation), thereby making it difficult to stretch.

Comparative Example 2 in which N,N'-m-phenylene dimalemide was added in an amount of 8 parts by mass showed high hardiness and stress at 100% elongation, but showed low elongation at break, and along therewith, showed the smallest strength at break and tear force.

Furthermore, as is apparent from the results of Table 2, in Example 10 in which the specific surface area is large, stress at 100% elongation, strength at break and tear force were largest values, and in Example 9 in which the specific surface area is small, those properties were smallest values.

On the other hand, regarding elongation at break and peel force, Example 9 in which the specific surface area is small showed the highest value, and Example 10 in which the specific surface area is large showed the lowest value. From those results, the silica of Example 3, having the specific surface area that is nearly the intermediate value between Example 9 and Example 10 had properties having most excellent balance.

In the comparison between Example 9 and Comparative Example 3, and between Example 10 and Comparative Example 4, Examples 9 and 10 in which the fatty acid amide was added showed high hardness, stress at 100% elongation, strength at break, tear force and peel force. This tendency is the same tendency as recognized in Example 3 with respect to Comparative Example 1. Therefore, it is seen that the interaction is present between silica and fatty acid amide even through the specific surface area of silica is changed.

(Production of Belt)

A laminate of a reinforcing cloth and an inner surface rubber layer sheet (unvulcanized rubber) was arranged in a flat mold with cogs in which tooth portions and groove portions are alternatively provided, in the state of the reinforcing cloth down, and press-pressurized at 75° C. to prepare a cogged pad having cog portions embossed (a pad which is not completely vulcanized and in a semi-vulcanized state). Next, both ends of the cogged pad were vertically cut from the top of a mountain portion of the cog.

A molded article was prepared by covering a cylindrical mold with an inner matrix having tooth portions and groove portions alternately provided, and then, winding the cogged pad so as to engage with the tooth portions and groove portions of the inner matrix and jointing itself at the top of the cog mountain portion, laminating an adhesive rubber layer sheet (a lower adhesive rubber: unvulcanized rubber) on the cogged pad wound, spinning a core wire spirally thereon, and sequentially winding another adhesive rubber layer sheet (an upper adhesive rubber: the same as the above adhesive rubber layer sheet), and a back surface rubber layer sheet (unvulcanized rubber) further thereon. The mold was thereafter covered with a jacket and arranged in a vulcanization can, and vulcanization was conducted at a temperature of 160° C. for a period of 20 minutes to prepare a belt sleeve. The sleeve was then cut into a V-shape in a given width in a lengthwise direction of the belt by using a cutter to shape into a belt having the structure shown in FIG. 1, that is, a raw edge cogged V-belt which is a variable speed belt having cogs at a belt inner circumference side (size: upper width 22.0 mm, thickness 11.0 mm, outer circumference length 800 mm).

The low edge cogged V-belts prepared are 11 kinds in which the combination of the adhesive rubber layer and the inner surface rubber layer (the back surface rubber layer has the same formulation as the inner surface rubber layer) was changed. Evaluation results of the belts obtained in the examples and the comparative examples are shown in Table 4.

TABLE 4

| | | Example | | | | | Comparative Example | | | |
|---|---|---|---|---|---|---|---|---|---|---|
| Material (parts) | | 2 | 3 | 4 | 5 | 6 | 1 | 2 | | |
| Adhesive layer | Fatty acid amide | 0.5 | 1 | 2 | 2 | 4 | 6 | 0 | 0 | 0 | 0 |
| | Stearic acid | 1 | 1 | 0 | 0 | 0 | 0 | 2 | 2 | 2 | 2 |
| | N,N'-m-phenylene | 4 | 4 | 4 | 4 | 4 | 4 | 4 | 4 | 8 | 8 |

TABLE 4-continued

| Material (parts) | | Example 2 | Example 3 | Example 4 | Example 5 | Example 6 | Comparative Example 1 | Comparative Example 2 | | |
|---|---|---|---|---|---|---|---|---|---|---|
| dimaleimide | | | | | | | | | | |
| Inner surface and back surface layers | | Rubber 1 | Rubber 1 | Rubber 1 | Rubber 2 | Rubber 1 | Rubber 1 | Rubber 2 | Rubber 1 | Rubber 2 |
| Durability traveling 1 Intermediate load, 10 N·m | Traveling time (hr) | 60 | 60 | 60 | — | 60 | 60 | 25 | — | 25 |
| | State | Not abnormal | Not abnormal | Not abnormal | — | Not abnormal | Not abnormal | Peeled | — | Peeled | — |
| Durability traveling 2 High load, 15 N·m | Traveling time (hr) | — | — | — | 60 | — | — | — | 10 | — | 40 |
| | State | — | — | — | Not abnormal | — | — | — | Peeled | — | Peeled |

As is apparent from the results of Table 4, regarding the durability traveling test 1 under intermediate load, the belts using the adhesive rubber layers of Examples 2 to 6 can travel for 60 hours, and durability was excellent. On the other hand, in the belts using the adhesive rubber layers of Comparative Examples 1 and 2, peeling occurred in an early stage at the interface between the adhesive rubber layer and the inner surface rubber layer.

Regarding the durability traveling test 2 under high load, the belt using the adhesive rubber layer of Example 4 can travel for 60 hours, and thus durability was excellent in high load condition. On the other hand, in the belts using the adhesive rubber layers of Comparative Examples 1 and 2, interfacial peeling was observed at 10 hours and 40 hours, respectively. From the comparison between Comparative Example 1 and Comparative Example 2 under high load condition, the effect of suppressing interfacial peeling is recognized by increasing hardness of the adhesive rubber layer, but it is seen that the effect is not sufficient in severer layout and under high load condition by merely increasing hardness of the adhesive rubber layer.

Examples 11 and 12

Properties of the vulcanized rubber were evaluated by changing the kind of fatty acid amide. That is, the formulation of the rubber composition was the same as Example 4 except for changing the kind of fatty acid amide, that is, fatty acid bisamide was added in Example 11, and fatty acid ester amide was added in Example 12 both in an amount of 2 parts by mass. The results of properties of vulcanized rubbers are shown in Table 5 together with the results of Example 4 and Comparative Example 1.

TABLE 5

| Material (parts) | Example 4 | Example 11 | Example 12 | Comparative Example 1 |
|---|---|---|---|---|
| Chloroprene rubber | 100 | 100 | 100 | 100 |
| Fatty acid amide | 2 | 0 | 0 | 0 |
| Fatty acid bisamide | 0 | 2 | 0 | 0 |
| Fatty acid ester amide | 0 | 0 | 2 | 0 |
| Stearic acid | 0 | 0 | 0 | 2 |
| Hardness (°) | 81 | 81 | 81 | 80 |
| stress at 100% elongation (MPa) | 5.0 | 4.7 | 4.5 | 4.0 |
| Strength at break (MPa) | 18.8 | 18.7 | 18.9 | 19.2 |
| Elongation at break (%) | 400 | 424 | 449 | 450 |
| Tear force (N/mm) | 65 | 74 | 71 | 58 |

As is apparent from the results of Table 5, Examples 4, 11 and 12 using fatty acid amide show high values in hardness, stress at 100% elongation, strength at break and tear force as compared with those of Comparative Example 1 using stearic acid, and elongation at break in Examples 4 and 11 was slightly decreased.

Although the present invention has been described in detail and by reference to the specific embodiments, it is apparent to one skilled in the art that various modifications or changes can be made without departing the spirit and scope of the present invention.

This application is based on Japanese Patent Application No. 2012-100332 filed on Apr. 25, 2012 and Japanese Patent Application No. 2012-231627 filed on Oct. 19, 2012, the disclosures of which are incorporated herein by reference.

INDUSTRIAL APPLICABILITY

The transmission belt of the present invention can be utilized as various belts in which transmission loss is required, can be further utilized in a synchronous power transmission belt such as a toothed belt, and is preferably utilized as a friction transmission belt. Examples of the friction transmission belt include a low edge belt having a V-shaped cross-section, a raw edge cogged V-belt having cogs provided at an inner circumference side or both an inner circumference side and an outer circumference side of a raw edge belt, and a V-ribbed belt. In particular, it is preferably applied to a belt (a variable speed belt) used in a transmission in which transmission gear ratio is continuously variable during belt traveling.

DESCRIPTION OF REFERENCE NUMERALS AND SIGNS

1 Adhesive rubber layer
2 Core wire
3 Inner surface rubber layer
4 Back surface rubber layer
5 Reinforcing cloth
6 Cog portion
12 Drive pulley
13 Driven pulley
11 Raw edge cogged V-belt

The invention claimed is:
1. A transmission belt comprising a core wire extending in a lengthwise direction of the belt, an adhesive rubber layer in contact with at least a part of the core wire, a back surface rubber layer formed on one surface of the adhesive rubber layer, and an inner surface rubber layer formed on the other surface of the adhesive rubber layer and engaging or in contact with a pulley, wherein the adhesive rubber layer is formed by a vulcanized rubber composition comprising a rubber component, a fatty acid amide and a silica.

2. The transmission belt according to claim 1, wherein the proportion of the fatty acid amide is from 0.3 to 10 parts by mass per 100 parts by mass of the rubber component.

3. The transmission belt according to claim 1, wherein the proportion of the fatty acid amide is from 1 to 30 parts by mass per 100 parts by mass of the silica.

4. The transmission belt according to claim 1, wherein the fatty acid amide comprises a fatty acid amide having a saturated or unsaturated higher fatty acid residue having from 10 to 26 carbon atoms or a higher amine residue having from 10 to 26 carbon atoms.

5. The transmission belt according to claim 1, wherein the silica has a nitrogen adsorption specific surface area according to BET method of from 50 to 400 $m^2/g$.

6. The transmission belt according to claim 1, wherein the rubber component comprises chloroprene rubber.

7. The transmission belt according to claim 1, which is a friction transmission belt.

* * * * *